May 7, 1957  F. B. VAVRINEK  2,791,024
DEVICE FOR BURNISHING, REAMING, AND DEBURRING ARTICLES
Filed Feb. 5, 1954
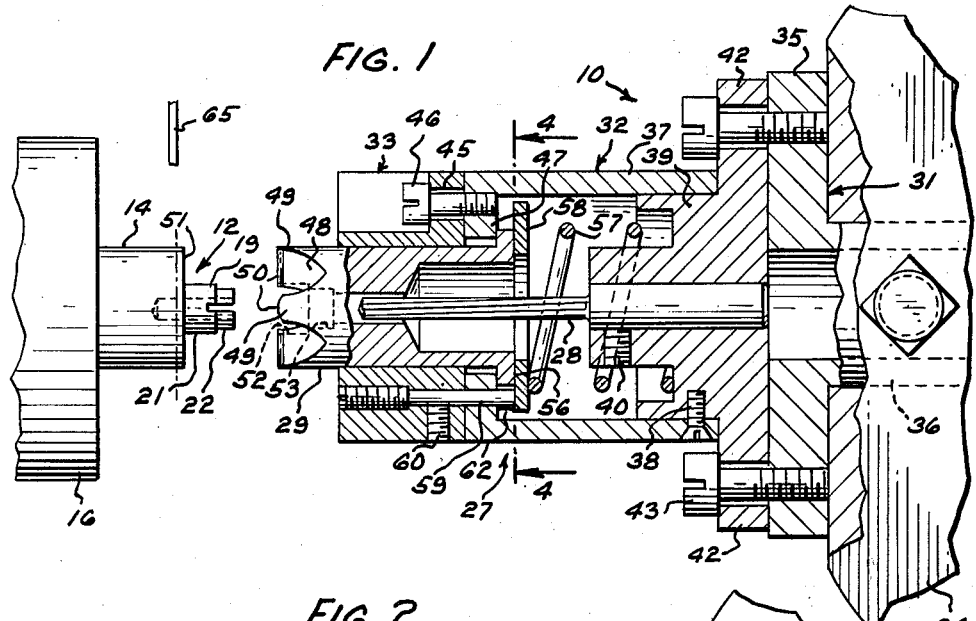
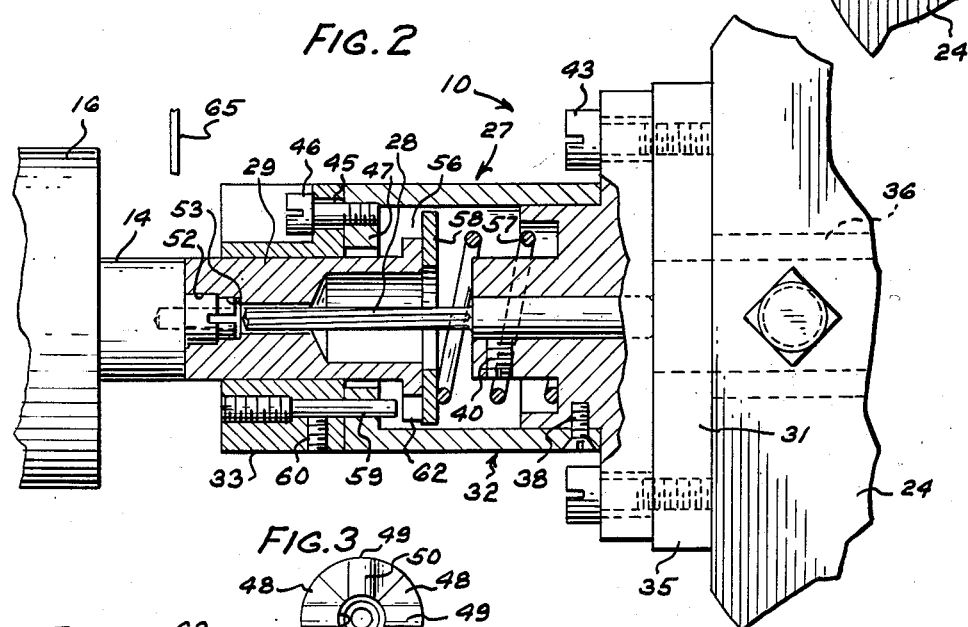
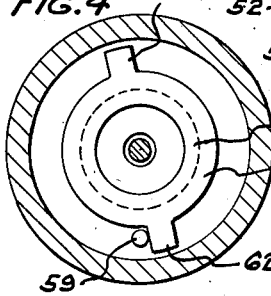
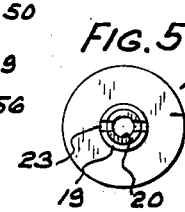
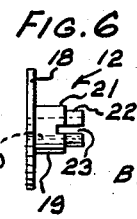
INVENTOR
F. B. VAVRINEK
BY
ATTORNEY United States Patent Office 2,791,024
Patented May 7, 1957

2,791,024

DEVICE FOR BURNISHING, REAMING, AND DEBURRING ARTICLES

Frank B. Vavrinek, Downers Grove, Ill., assignor to Western Electric Company, Incorporated, New York, N. Y., a corporation of New York Application February 5, 1954, Serial No. 408,316

6 Claims. (Cl. 29—90)

This invention relates to a device for finishing a portion of an article and more particularly to a tool for burnishing, deburring, and reaming a slotted partially formed piece part during the manufacture thereof.

It is an object of the present invention to provide an improved tool for burnishing and reaming an article during the manufacture thereof.

It is a further object of the invention to provide a tool for burnishing, deburring, and reaming a slotted tubular part during the manufacture thereof.

A tool illustrating certain features of the invention may include a hollow cylindrical holder for supporting a reamer along the axis thereof and for supporting a hollow cylindrical burnishing element in coaxial alignment with the reamer and for limited axial movement relative thereto to and from a normal forward position. The burnishing element is resiliently urged to its forward position, and means are provided for locking the burnishing element against rotation while in said forward position and when the tool, which is mounted in a turret of a screw machine, is advanced toward a rotating article partially formed on rod stock in the spindle chuck, the recessed end of the hollow burnishing element engages the partially formed article and receives the slotted apertured tubular end portion of the article therein and removes the slotting burrs therefrom and burnishes portions of the article, and after the burnishing is completed the tool is further advanced to move the reamer into the aperture in the part and to effect relative longitudinal movement between the holder and the burnishing element, thereby releasing the burnishing element from locking engagement with the holder and permitting the burnishing element to rotate with and support the end portion of the article against radial movement while the reamer is advanced along the aperture therein.

Other objects and advantages of the invention will become apparent by reference to the following detailed description and the accompanying drawings, illustrating a preferred embodiment thereof, in which Fig. 1 is a plan sectional view of a portion of the screw machine with the burnishing and reaming tool mounted thereon in spaced relation to a partially formed article on which the tool is to work;

Fig. 2 is a view similar to Fig. 1 showing the tool in engagement with the article and with parts of the tool in a different position;

Fig. 3 is an end view of the burnishing element;

Fig. 4 is a cross-sectional view of the tool taken on the line 4—4 of Fig. 1;

Figs. 5 and 6 are end and transverse sectional views, respectively, of the article acted upon by the tool.

The present tool 10 is designed to perform a burnishing, reaming, and burr removing operation on a partially formed article 12 made from rod stock 14 gripped in and rotated by a spindle chuck 16 of a screw machine. The finished article 12 has a disc portion 18 with a central stud 19 projecting therefrom which has a central aperture 20 and stepped outer cylindrical surfaces 21 and 22, and a transverse slot 23. At the time when the tool 10 performs the burnishing, burring, and reaming operations, the article 12 is partially formed as shown in Fig. 1 and the stock 14 has a stud 19 formed thereon, a central aperture 20 drilled therein, and the slot 23 cut therethrough.

The tool 10 which is adapted to be carried by the turret 24 of the screw machine, comprises a holder 27 for holding a reamer 28 and a hollow cylindrical burnishing element 29. The holder 27 is a composite structure comprising components 31, 32, and 33. The component 31 is provided with a substantially elliptical plate 35 and a central shank 36 extending therefrom, which shank is adapted to fit into a recess in the turret 24 and be secured therein. The component 32 comprises a cylindrical shell 37 secured by screws 38 to a member 39 which has a centrally apertured boss for receiving the shank of the reamer 28 therein and has a screw 40 for locking the reamer against movement relative thereto. The member 39 also has a pair of flanges 42 apertured to receive the shanks of locking screws 43, the threaded ends of which are secured in threaded apertures in the plate 35. The apertures in the flanges 42 are sufficiently large to permit limited transverse movement of the component 32 to coaxially align the reamer 28 and the shell 37 with the axis of the shank 36, and the rod stock 14 after which the locking screws 43 are tightened to secure the components 31 and 32 in properly aligned position.

The component 33 has a cylindrical inner surface for slidably supporting the cylindrical burnishing element 29 and has a pair of apertures 45 for receiving the shanks of a pair of attaching screws 46, the threaded ends of which engage in threaded apertures in the inwardly flanged portion 47 of the shell 37. The apertures 45 are sufficiently large to permit limited radial movement of the component 33 relative to the component 32 to permit the coaxial alignment of the burnishing element 29 with the reamer 28 and the rod stock 14, after which the attaching screws 46 are tightend to secure them in aligned relation.

The burnishing element 29 has a central aperture providing clearance for the reamer 28 and at its forward end it is slotted at 48 to provide four fingers 49 equally spaced about the axis of the burnishing element and separated from adjacent fingers. The forward ends of the fingers have curved cylindrical burnishing surfaces 50 disposed radially of the axis of the burnishing element. The forward portions of cylindrical burnishing surfaces are disposed in a plane and are adapted to engage and burnish the flat end surface 51 of the rod stock 14 around the stud 19. The burnishing element 29 has inner cylindrical burnishing surfaces 52 and 53 adapted to engage and burnish the cylindrical surfaces 21 and 22 of the stud 19. At its opposite end the burnishing element 29 has an annular flange 56 adapted to engage the inwardly directed flange 47 of the shell 37 and limit the outward axial movement of the burnishing element 29 to a predetermined forward position. A spring 57 serves to stress the burnishing element 29 to and yieldably maintain it in its forward position. A washer 58 is interposed between the end of the spring and the end of the burnishing element 29.

Means are provided for locking the burnishing element 21 against rotation relative to the holder 27 when the burnishing element 29 is in its forward position. The locking means comprises a pin 59 disposed in apertures in the components 32 and 33 in parallel relation to the axis of the tool 12 and locked in position by a screw 60 with the end portion of the pin 59 projecting rearwardly a predetermined distance and adapted to engage one of the radially disposed lugs 62 formed as extensions of the flange 56 on the burnishing element 29.

The burnishing element 29 is held against rotation while it remains in its forward position with one of the lugs 62 thereof in engagement with the pin 59, and in response to a predetermined relative movement between the burnishing element 29 and the holder 27 to the position shown in Fig. 2 where the lugs 62 are disengaged from the pins 59, the element 29 is free to rotate with the rod stock 14.

In the operation of the tool the forward end of the rod stock 14 has been formed as shown in Fig. 1, at which time it is desired to burnish the face 51 thereof and the cylindrical surfaces 21 and 22 of the stud portion 19, to remove the burrs from the slot 23, and to ream the aperture 20 therein. The turret 24 with the tool 10 thereon in the position shown in Fig. 1 is advanced toward the rod stock 14 until the burnishing surfaces 50 of the fingers 49 of the burnishing element 29 is pressed into engagement with the face 51 of the rod stock 14 and the surfaces 21 and 22 of the stud 19 are engaged by the burnishing surfaces 52 and 53 of the element and are burnished thereby as the rod stock rotates relative to the burnishing element 29, which is held against rotation. The fingers 49 of the burnishing element 29 also serve to remove the burrs from the slot.

When the burnishing operation is completed, the turret 24 and the tool 10 are advanced further toward the rod stock 14, causing the reamer 28 to enter the aperture 20 of the stud portion 19 and ream it to a predetermined size and simultaneously therewith causing relative axial movement between the holder 27 and the element 29 which is then held against the end of the rod stock 14. After the lug 62 of the burnishing element 29 disengages from the pin 59, the burnishing element 29 is free to rotate with the rod stock 14, and cylindrical surfaces 52 and 53 of the element 29 serve to hold the slotted end portion of the stud 19 against radial spreading movement during the reaming of the aperture 20 therein. After the reaming of the aperture 20 is completed, the turret 24 and the tool 10 are returned to starting position, thus completing the burnishing, reaming, and deburring of the partially formed article 10 on the rod stock 14. The article 10 may then be cut from the rod stock along the dotted line as indicated in Fig. 1 by a cutting tool 65 moved readily into the stock 14.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for finishing portions of a slotted tubular article comprising a hollow cylindrical burnishing element having a plurality of axially directed slots in one end thereof and an inner cylindrical surface engageable with the outer surface of a portion of said article for burnishing, deburring, and supporting same, a tool for finishing the inner surface of said article, a holder for fixedly supporting said tool and rotatably supporting the burnishing element in coaxial alignment with each other and for limited axial movement of a burnishing element to and from a normal position in advance of said tool, resilient means for moving said burnishing element to and yieldably maintaining it in said normal position, and means for locking said burnishing element against rotation relative to said tool when said burnishing element is in said normal position and for permitting rotation of one relative to the other in response to a predetermined relative axial movement of said element and said tool towards each other from said normal position.

2. A device for finishing portions of an article having a flat annular face and a slotted tubular portion projecting therefrom comprising a burnishing tool having a central aperture therethrough and having a plurality of surfaces thereon in angularly spaced relation to each other engageable with the annular face of said article for burnishing said face and having angularly spaced inner cylindrical surfaces engageable with the outer cylindrical surfaces of the slotted tubular portion on said article for burnishing, deburring, and supporting portion, a reaming tool coaxially disposed within said burnishing tool for finishing the inner cylindrical surface of said article, a holder for fixedly supporting the reaming tool and for supporting the burnishing tool for rotation and axial movement to and from a normal position in advance of said reaming tool, resilient means for yieldably maintaining said burnishing tool in said normal position, and means for locking said burnishing tool against rotation when in said normal position and for releasing said burnishing tool for rotation in response to a predetermined axial movement thereof.

3. A device for finishing portions of the interior and exterior of a slotted tubular article comprising a hollow burnishing element having a plurality of fingers at one end thereof disposed about the axis of said element and in spaced relation to each other and having inner cylindrical surfaces engageable with a portion of the outer cylindrical surface of said tubular article for supporting, burnishing, and removing the burrs from the slotted portion thereof, a tool engageable with the inner surface of said article, a holder for fixedly supporting said tool and for rotatably supporting said burnishing element in coaxial alignment relative to each other and for movement of the burnishing element relative to the tool to and from a normal forward position with the burnishing surfaces thereof disposed in advance of said tool, means for moving said burnishing element to and yieldably holding it in said forward position, means for locking said element against rotation relative to said holder when said burnishing element is in said forward position and for disengaging said locking means in response to relative axial movement through a predetermined distance between said burnishing element and said holder, whereby said tubular article and said holder may be moved relative to each other in rotary and axial directions to cause the slotted end portion of the tubular article to be burnished, deburred, and supported by said inner cylindrical surfaces of said element, and in response to further axial movement between said tubular article and said holder to effect the movement of said tool into engagement with the inner surface of said articles and the disengagement of said burnishing element from locking engagement with said holder to permit the rotation of said element with said article.

4. A device for finishing portions of an apertured article having a flat annular surface and a slotted tubular part extending therefrom comprising a hollow burnishing element having a plurality of fingers at one end thereof disposed about the axis of said element in spaced relation to each other and having inner cylindrical surfaces engageable with the outer cylindrical surface of the slotted part for burnishing and deburring same and supporting the slotted part against radial spreading movement, said fingers having curved radially disposed surfaces engageable with the annular face of said article for burnishing said face, a tool engageable with the inner surface of said article, a holder for fixedly supporting said tool and said burnishing element in coaxial alignment relative to each other and for movement of the burnishing element relative to the tool to and from a normal forward position with the burnishing surfaces thereof disposed in advance of said tool, means for moving said burnishing element to and yieldably holding it in said forward position, means for locking said element against rotation relative to said holder when said burnishing element is in said forward position and for releasing said locking means in response to axial movement of said burnishing element through a predetermined distance.

5. A device for finishing portions of an apertured article having a flat annular surface and a slotted tubular part extending therefrom comprising a hollow burnishing element having a plurality of fingers at one end thereof disposed about the axis of said element in spaced relation to each other and having inner cylindrical surfaces engageable with the outer cylindrical surface of the slotted part for burnishing and deburring same and supporting the slotted part against radial spreading movement, said fingers having curved radially disposed surfaces engageable with the annular face of said article for burnishing said face, a tool disposed within said hollow burnishing element and engageable with the inner surface of said article, a holder for fixedly supporting said tool and for supporting said burnishing element for rotary and axial movement relative to the tool to and from a normal forward position with the burnishing surfaces thereof disposed in advance of said tool, means for moving said burnishing element to and yieldably holding it in said forward position, means for locking said element against rotation relative to said holder when said burnishing element is in said forward position and for releasing said locking means in response to a predetermined axial movement of said burnishing element relative to said tool, said holder being a composite structure and having one component for supporting the burnishing element, and a second component for supporting said tool, and means for adjustably securing said components together with said tool in coaxial alignment with said burnishing element.

6. A device for finishing portions of an article having a flat annular face and a slotted tubular portion comprising a holder, a hollow burnishing element mounted for rotary and axial movement on said holder and having a plurality of surfaces thereon engageable with said annular face of the article for burnishing said face and having spaced cylindrical surfaces engageable with the outer cylindrical surfaces of the slotted tubular portion of the article for burnishing and supporting said tubular portion of a tool fixedly mounted on said holder within said hollow burnishing element and in coaxial relation thereto for finishing the inner surfaces of the tubular portion of said article, means for limiting the axial movement of said burnishing element in one direction to a predetermined normal position with the burnishing surfaces thereof in advance of said tool, spring means on said holder for moving said burnishing element to and yieldably maintaining it in said normal position, and means for locking said burnishing element against rotation in said normal position and for releasing said burnishing element for rotation in response to a predetermined axial movement thereof from said normal position.

References Cited in the file of this patent
UNITED STATES PATENTS 1,188,437    Gates _____ June 27, 1916